(12) United States Patent
Tessier

(10) Patent No.: US 8,076,038 B2
(45) Date of Patent: Dec. 13, 2011

(54) FUEL CELL WITH VERTICAL DISPLACEMENT

(75) Inventor: Pascal Tessier, Wilmington, DE (US)

(73) Assignee: American Air Liquide, Inc., Fremont, CA (US)

( * ) Notice: Subject to any disclaimer, the term of this patent is extended or adjusted under 35 U.S.C. 154(b) by 434 days.

(21) Appl. No.: 12/416,114

(22) Filed: Mar. 31, 2009

(65) Prior Publication Data

US 2010/0248057 A1 Sep. 30, 2010

(51) Int. Cl.
*H01M 8/04* (2006.01)
*H01M 8/00* (2006.01)

(52) U.S. Cl. .................................. 429/437; 429/535

(58) Field of Classification Search .................. 429/414, 429/415, 428, 429, 437, 535, 413; 29/623.1, 29/402.03
See application file for complete search history.

(56) References Cited

U.S. PATENT DOCUMENTS

| | | | |
|---|---|---|---|
| 0,916,011 A | | 3/1909 | Poor |
| 4,781,241 A | * | 11/1988 | Misage et al. ............... 165/140 |
| 6,479,177 B1 | | 11/2002 | Roberts et al. |
| 6,696,192 B2 | | 2/2004 | Kanai et al. |
| 6,797,421 B2 | | 9/2004 | Assarabowski et al. |
| 6,855,444 B2 | | 2/2005 | Morishima et al. |
| 6,905,791 B2 | | 6/2005 | Busenbender |
| 6,955,861 B2 | | 10/2005 | Yoshizawa et al. |
| 7,264,895 B2 | | 9/2007 | White |
| 7,354,669 B2 | * | 4/2008 | Hobmeyr et al. ............. 429/415 |
| 7,695,848 B2 | * | 4/2010 | Yoshizawa et al. ........... 429/437 |
| 7,851,097 B2 | * | 12/2010 | Suematsu et al. ............. 429/428 |
| 7,985,507 B2 | * | 7/2011 | Kamihara ..................... 429/415 |
| 2004/0028970 A1 | * | 2/2004 | Sakai et al. ..................... 429/24 |
| 2007/0099049 A1 | | 5/2007 | Knight |
| 2008/0145714 A1 | * | 6/2008 | Kagami ......................... 429/13 |
| 2009/0142635 A1 | * | 6/2009 | Na .................................. 429/24 |
| 2009/0233147 A1 | * | 9/2009 | Yoshizawa et al. ............. 429/33 |

OTHER PUBLICATIONS

Oszcipok, et al., "Portable Proton Exchange Membrane Fuel-Cell Systems for Outdoor Applications," Journal of Power Sources, 157, (2006), pp. 666-673.
Yan, et al., "Effect of Sub-Freezing Temperatures on a PEM Fuel Cell Performance, Startup and Fuel Cell Components," Journal of Power Sources, 160, (2006) pp. 1242-1250.

* cited by examiner

*Primary Examiner* — Chandrika Prasad
(74) *Attorney, Agent, or Firm* — Christopher J. Cronin

(57) ABSTRACT

A fuel cell system includes a housing partially above and below the ground containing a fuel cell beneath ground level and a fuel tank disposed above the fuel cell. The fuel cell may be accessed by raising it to above ground level with a fuel cell vertical displacement device.

12 Claims, 2 Drawing Sheets

FUEL CELL WITH VERTICAL DISPLACEMENT

CROSS-REFERENCE TO RELATED APPLICATIONS

None.

BACKGROUND

Fuel cell systems convert hydrogen into electrical power while emitting only water and heat. Fuel cells based on proton exchange membranes (PEM) generally need to be humidified to conduct protons. Concurrent conduction of protons through the electrolyte and conduction of electrons through an external load is the working principle of fuel cells.

Because membranes in PEM fuel cells need to be humidified and because fuel cells produce water, water is always present in fuel cells. This causes problems for fuel cells operating or stored at temperatures below the freezing point of water (0° C.). A first problem is the possible freezing of water in cells, humidifiers and gas tubing, blocking the passage of gases upon start-up. A second problem is the possible damage to membranes, membrane electrode assemblies (MEA) and fuel cell humidifiers due to the formation of ice. A third problem is the suboptimal operation of fuel cell when waste heat from the fuel cell stack is insufficient to bring the latter to the optimal operating temperature. A fourth problem is the need to have fuel cell system components that are specified to operate at freezing temperatures. While strategies are currently being used to mitigate the effect of freezing temperatures on PEM fuel cells, those conditions still lead to suboptimal operation and damage to membranes.

High ambient temperatures can also be a problem when the cooling subsystem is unable to keep fuel cells below a temperature limit where membranes and components can operate without damage. Either a disproportionately costly and energy consuming cooling system has to be used or the fuel cell has to be shutdown above an ambient temperature limit.

Finally, the deployment of stationary fuel cell systems is generally limited by their high cost. While fuel cell themselves have a high cost due to membranes and catalysts, stationary fuel cell system installations also bring the cost of hydrogen storage, the cost of installing the fuel cell systems and storage on a secure base, usually comprising concrete pads and fencing, with the required civil engineering costs.

Some have proposed solutions to the problems described above. One current practice (as disclosed by U.S. Pat. No. 6,479,177 B1) to avoid the formation of ice after shutdown in freezing conditions by purging the fuel cell tubing and stack of water. Another solution is to provide insulation and to heat the fuel cell when it is stopped in freezing conditions (see U.S. Pat. Nos. 6,955,861 B2, 6,797,421 B2, and 6,696,192 B1 as well as Published U.S. Patent Application No. 20030087139. U.S. Pat. No. 6,905,791 B2 describes the injection of an anti-freeze compound below a certain temperature. However, these solutions have drawbacks, such as consumption of energy for heating instead of providing power to external loads. The fuel cell system also has to work in varying temperature conditions, which requires a more adaptable, and therefore more costly, thermal management system. Purging water from the system does not solve the issue of slow start-up in freezing conditions. Also, these procedures do not address the issue of cooling when operating in extremely warm conditions.

Thus, those of ordinary skill in the art will recognize that there is a need for an improved solution to the above problems.

SUMMARY

There is disclosed a fuel cell system including: a housing having an access opening or door; a fuel tank disposed within said housing at an upper portion thereof, said fuel tank containing a fuel; a fuel cell adapted to electrochemically produce water and electricity from the fuel and an oxidant, said fuel cell being adapted to rest on a support disposed at a bottom of a hole within which a lower portion of said housing rests; an oxidant line fluidly communicating between a source of oxidant and the fuel cell; a fuel line fluidly communicating between said fuel tank and said fuel cell; and a fuel cell vertical displacement device adapted to lower and raise the fuel cell between a lowered position where the fuel cell rests upon the support at the bottom of the hole within which the lower portion of said housing rests and a raised position where the fuel cell is accessible from outside said housing via said access opening or door.

There is also disclosed a method of installing the above fuel cell system. The method includes the following steps. A hole is excavated in the ground. At least lower portion of said housing is placed or formed in the hole. The fuel cell vertical displacement device is secured to said fuel cell and said housing. The fuel tank is placed within said upper portion of said housing. The fuel line is connected to said fuel tank and said fuel cell. The oxidant line is connected to said source of oxidant and said fuel cell. The fuel cell is lowered with said vertical displacement device to rest at a bottom of the hole without or without a support underneath.

There is also disclosed a method of maintaining the installed fuel cell system according to the above method of installation. The method includes the following the steps. The fuel line is disconnected into first and second portions, said first fuel line portion connected to said fuel tank and said second fuel line portion connected to said fuel cell. The oxidant line is disconnected into first and second portions, said first oxidant line portion being connectable to said source of oxidant and said second oxidant line portion being connected to said fuel cell. The fuel cell is raised with the fuel cell vertical displacement device to a position accessible through said door. Maintenance is performed upon the fuel cell. The fuel cell is lowered with the fuel cell vertical displacement device to the ground at the bottom of the hole. The fuel line portions are connected. The oxidant line portions are connected.

The above system and methods may include one or more of the following aspects.

the fuel is hydrogen, said tank is a compressed hydrogen tank, said oxidant is air, and said oxidant line fluidly communicates between said fuel cell and an atmosphere adjacent said housing.

the cell system further includes thermal insulation disposed above said fuel cell and/or between said fuel cell and said lower portion of said housing.

the fuel cell system further includes:
  a coolant reservoir in heat exchange with said fuel cell; and
  said fuel line includes a heat exchanger extending through an interior of said reservoir, said fuel line heat exchanger being adapted to exchange heat between said fuel flowing therethrough and coolant contained within said reservoir.

the fuel cell system further includes:

a coolant reservoir in heat exchange with said fuel cell; and said oxidant line includes a heat exchanger extending through an interior of said reservoir, said oxidant line heat exchanger being adapted to exchange heat between said oxidant flowing therethrough and coolant contained within said reservoir.

the fuel cell system further includes:

a coolant reservoir in heat exchange with said fuel cell;

said fuel line includes a heat exchanger extending through an interior of said reservoir, said fuel line heat exchanger being adapted to exchange heat between said fuel flowing therethrough and coolant contained within said reservoir; and said oxidant line includes a heat exchanger extending through an interior of said reservoir, said oxidant line heat exchanger being adapted to exchange heat between said oxidant flowing therethrough and coolant contained within said reservoir.

the fuel cell is disposed at a height below a frost line of the ground adjacent the hole.

the method, wherein:

said fuel cell system further comprises a reservoir in heat exchange with said fuel cell; and said fuel line includes a heat exchanger extending through an interior of said reservoir, said fuel line heat exchanger being adapted to exchange heat between said fuel flowing therethrough and coolant contained within said reservoir.

the method, wherein:

said fuel cell system further comprises a reservoir in heat exchange with said fuel cell; and said oxidant line includes a heat exchanger extending through an interior of said reservoir, said oxidant line heat exchanger being adapted to exchange heat between said oxidant flowing therethrough and coolant contained within said reservoir.

the method, wherein:

said fuel cell system further comprises a reservoir in heat exchange with said fuel cell;

said fuel line includes a heat exchanger extending through an interior of said reservoir, said fuel line heat exchanger being adapted to exchange heat between said fuel flowing therethrough and coolant contained within said reservoir; and said oxidant line includes a heat exchanger extending through an interior of said reservoir, said oxidant line heat exchanger being adapted to exchange heat between said oxidant flowing therethrough and coolant contained within said reservoir.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
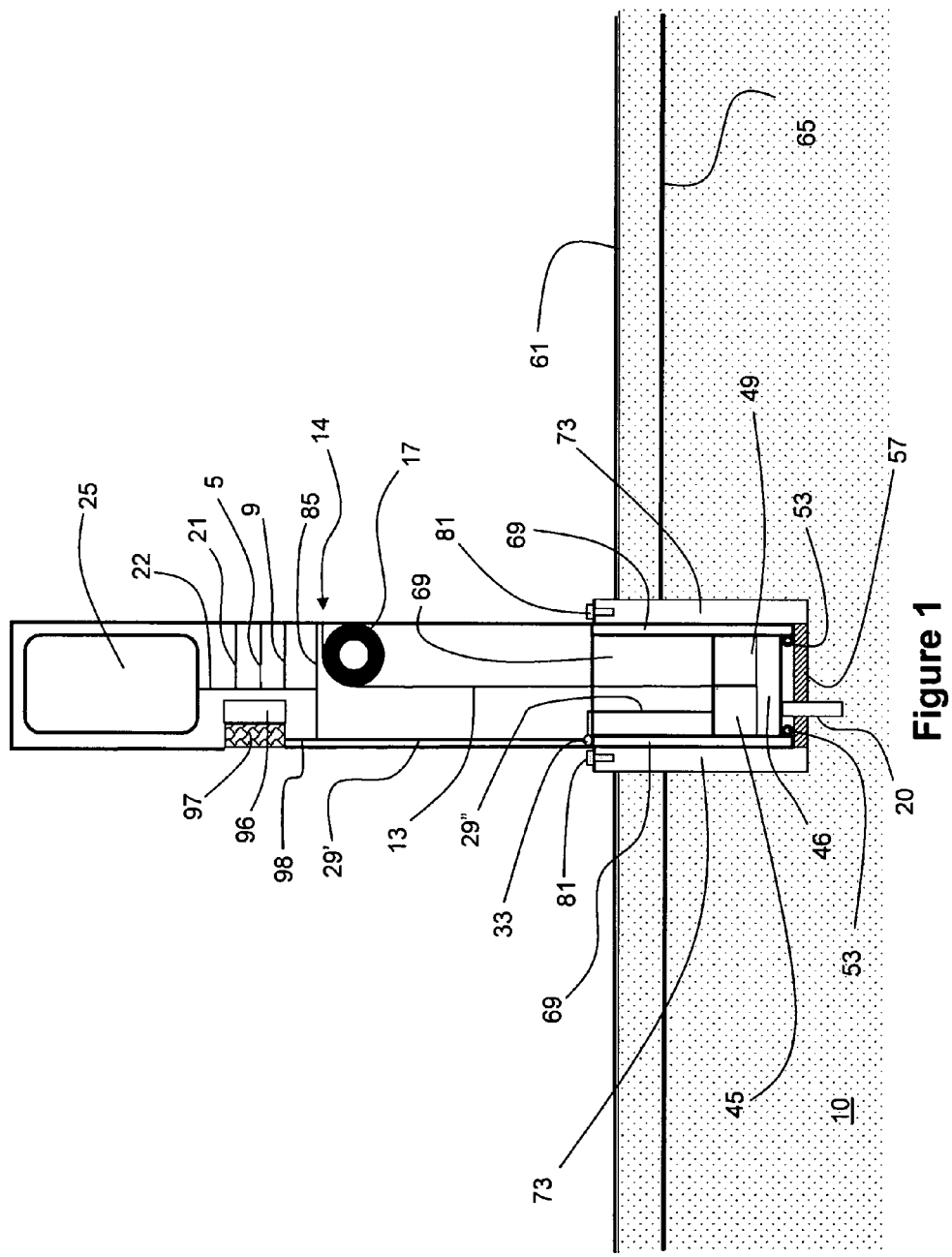
FIG. 1 is a cross-sectional schematic with (portions of the housing not shown) of an embodiment of the inventive system with the fuel cell stack in the lowered position
Figure 2:
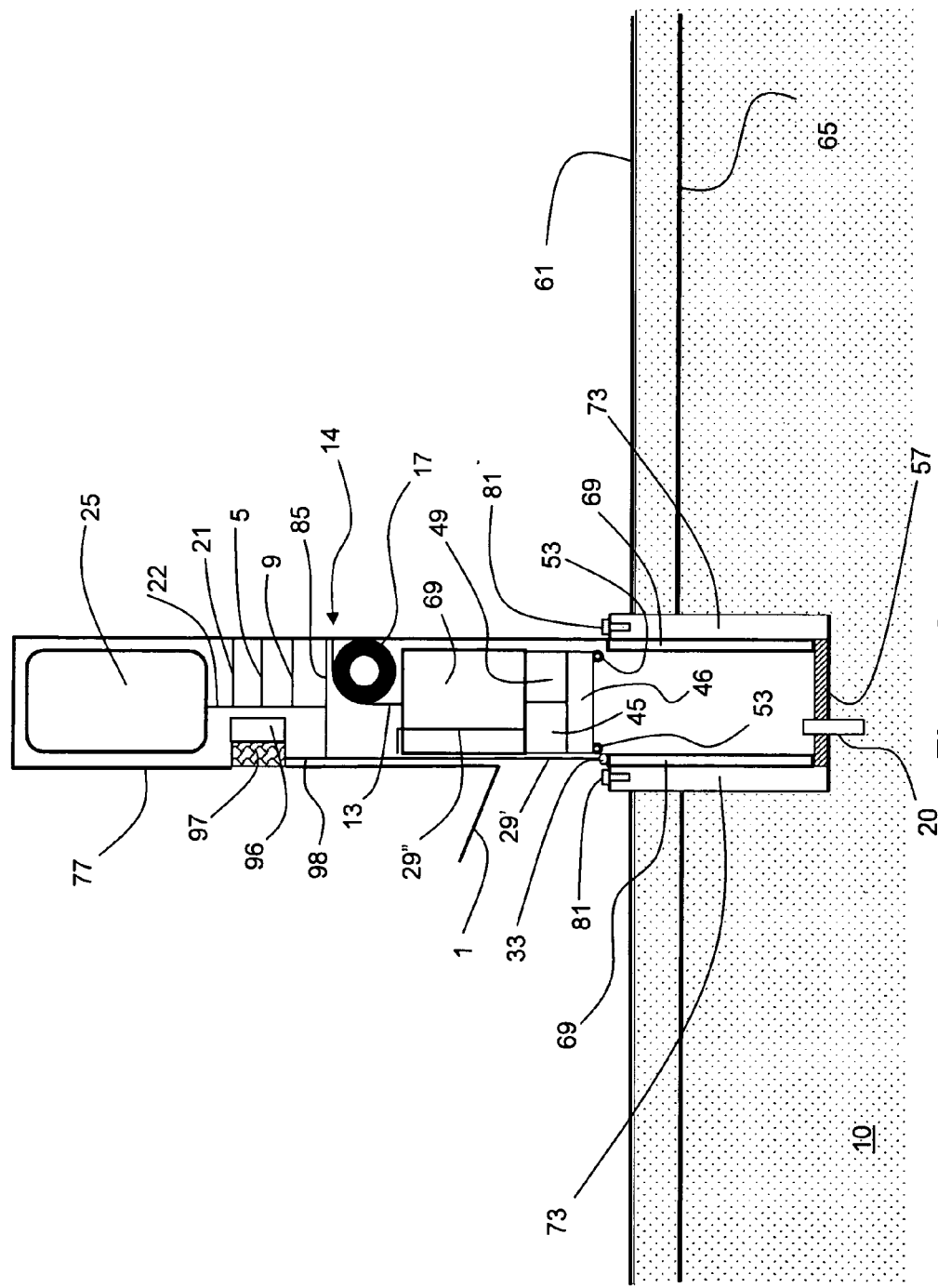
FIG. 2 is a cross-sectional schematic of the embodiment of FIG. 1 with the fuel cell stack in the raised position.

As best shown in FIGS. 1-2, an interior of the fuel cell system may be accessed by opening door 1. Optionally, the door 1 may be removed from housing 77. During operation, hydrogen from compressed hydrogen cylinder 25 flows through hydrogen conduit 22, while air flows into air intake 9. The portion of the housing 77 adjacent the air intake 9 may be louvered downwardly and the portion of the housing 77 adjacent exhaust line 5 may be louvered upwardly in order to separate the flow of air flowing into air intake 9 from the flow of excess air and hydrogen being exhausted from exhaust line 5. Additionally or alternatively, each of the air intake 9 and exhaust line 5 may be disposed on different sides of the housing.

While the combination of air intake 9, hydrogen conduit 22, exhaust line 5, cooling lines 98, and cable 85 in practice separately extend from the fuel cell stack 45 and fuel cell auxiliary components 49, for ease of illustrating a two-dimensional, elevation view schematic, they are illustrated as line 29' above quick connections 33 and as line 29" below connections 33. Thus, in actuality air intake 9, hydrogen conduit 22, exhaust line 5, cooling lines 98, and cable 85 are separate from one another.

The hydrogen and air flow through hydrogen conduit 21 and air intake 9 through respective heat exchangers (not shown) disposed within coolant reservoir 46 and thenceforth to fuel cell stack 45. In this manner, the temperatures of the hydrogen and air are moderated, thereby helping the fuel cell stack 45 to achieve a more optimal operating temperature.

The temperature moderation of the air and hydrogen flows is especially important when the air temperature above ground level 61 is below the freezing point of water. Under these conditions, the cold hydrogen and air (less than 0° C.) are heated by indirect heat exchange with the coolant contained within the interior of the reservoir 46 to help prevent freezing of moisture within the fuel cell stack 45. Because the reservoir 46 is located underground, passive heat exchange between the ground 10 and the walls of the reservoir 46 via support 57 helps maintain a reservoir 46 interior temperature above the freezing point of water. Preferably, the reservoir 46 is disposed beneath the frost line 65.

The compressed hydrogen cylinder 25 may be filled via line 21 at an access (not shown) through upper housing 77. This access is preferably placed at a height not accessible by a person outside the housing 77 without the aid of a tool or support in order to deter tampering with the compressed hydrogen cylinder 25.

The support 57 isolates the fuel cell stack 45 from contaminants and insects. While the support 57 may be made of any material, preferably it is made of a heat conducting material such as metal. However, cement may be used.

The fuel cell auxiliary components 49 includes the typical equipment associated with a fuel cell such as electronics, a battery, an external humidifier, and an air blower or compressor for pressurizing the air feed.

The upper housing 77 is preferably made of a rigid metal such as steel or aluminum and may be secured to a lower housing 73 (preferably of concrete) with bolts 81.

Freezing of moisture within the fuel cell stack 45 is further prevented by isolating the fuel cell stack 45 and associated fuel cell auxiliary components 49 from the air and from the frozen ground 10 above the frost line 65. This is accomplished with thermal insulating blocks 69 disposed above and around the fuel cell stack 45 and fuel cell auxiliary components 49. The frost line 65 is the lowest depth at which soil freezes during the year. This depth depends on the location, soil characteristics and snow cover, and varies from a few centimeters in temperate climates to over a meter in many regions of Canada with cold winters. Provided that the thermal insulating blocks 69 provide insulation at least equal to the surrounding soil and given that the lower housing 73 will be in thermal contact with the non-frozen ground 10 below the frost line 65, the fuel cell system will not be exposed to freezing. Additionally, each of the hydrogen conduit 21, air intake 9, exhaust line 9, coolant line 98 and/or connections 33 may be thermally insulated. Furthermore, weather-stripping may be provided between adjacent surfaces of the thermal insulating blocks 69 and the upper housing 77.

Excess air, unreacted hydrogen, and moisture resulting from reaction of the hydrogen and air are vented from the fuel cell stack 45 via an exhaust line 5. In the case where moisture tends to condense in air and/or exhaust line 5, a basin may be disposed beneath the fuel cell stack 45 to collect the liquid water. The liquid water is discharged into drain 20.

When the temperature above ground level 61 is not below freezing such that freezing of moisture within the fuel cell stack 45 is not an issue, excess heat may become a concern. Even if the temperature above ground level 61 is below freezing, running the fuel cell stack 45 for a sufficiently long period of time may also result in excessive heat. In these cases, excess heat may be removed from the fuel cell stack 45 with a cooling circuit utilizing a temperature probe, thermostat, coolant line 98, radiator 97, and fan 96. A temperature probe is typically placed within or adjacent to the fuel cell stack 45 or within the coolant fluid just as it exits the fuel cell stack 45. When the temperature rises to a sufficiently high level, the thermostat opens up the cooling circuit such that the coolant fluid circulates through radiator 97 via coolant line 98. The fan 96 helps achieve greater heat exchange between the coolant and ambient air at radiator 97. Of course, the coolant reservoir 46 fluidly communicates with, and acts as a buffer vessel for, the cooling circuit.

Because the reservoir 46 is in heat exchange with the non-frozen ground 10 below the frost line 61 through support 57, the temperature of the coolant fluid is moderated in comparison to the relatively frigid air above ground. So when excess heat is not a concern, the coolant from coolant reservoir 46 may still optionally be circulated through fuel cell stack 45. This helps to avoid freezing of moisture within the fuel cell stack 45.

As best illustrated in FIG. 2, easier access to the fuel cell stack 45, coolant reservoir 46, and fuel cell auxiliary components 49 may be achieved as follows. First, the upper portions of each of the air intake 9, hydrogen conduit 21, exhaust line 5, and coolant line 98 (depicted as line 29') are disconnected from the corresponding lower portions (depicted as line 29") at connections 33. One of ordinary skill in the art will recognize that several different types of connections 33 may be used in practice of the invention, such as quick disconnect or conventional valves.

Next, cable 13 is drawn across pulley 17 via access 14 through housing 77. The ease of pulling cable 13 may be enhanced by providing a counterweight at an end thereof. Also, one of ordinary skill in the art will recognize that pulley 17 and brute force are not essential to practice of the invention. Rather, any one of a number of commercially available motorized drives may be used to raise and lower the stack 45, reservoir 46, and auxiliary components 49 via cable 13.

Once a suitable height is gained, the cable 13 may be secured. The fuel cell stack 45 and auxiliary components 49 may then be accessed and rolled onto the ground via wheels 53. After maintenance is performed, the fuel cell stack 45, auxiliary components 49 and/or reservoir 46 are rolled back into position and cable 13 slowly released. In order to prevent unauthorized access to the interior of the housing, the door 1 may be locked.

The fuel cell stack 45 and fuel cell auxiliary components 49 are connected to a load via cable 85. The load may be any device consuming electricity such as, for example, a light-producing device, an antenna, or other communication device. Additionally, the fuel cell stack 45 and fuel cell auxiliary components 49 may be connected to an electricity generating device, such as a windmill or solar panel, in order to supplement the electrical production during periods of high demand or low production.

One or ordinary skill in the art will recognize that the invention may be utilized with fuel cell systems consuming reactants other than hydrogen and air. Thus, in one embodiment the fuel cell stack 45 may consume oxygen instead of air. In this case, a compressed oxygen cylinder may be included in an upper portion of the fuel cell system within upper housing 77 above ground and be connected to air intake 9. In another embodiment, the fuel cell stack 45 may consume a fuel other than hydrogen, in which case a suitable container for the non-hydrogen fuel may be used instead of compressed hydrogen cylinder 25. The hydrogen conduits can otherwise be used for handling the non-hydrogen fuel.

The fuel cell system may be installed according to the following steps. First, a hole is excavated from the ground 10, preferably to a depth below the frost line 65. Concrete may be poured into a mold within the hole to form the lower housing 73. Alternatively, a lower housing 73 made of pre-formed concrete may be placed within the hole. Preferably, the ground 10 is compacted before and/or after pouring the concrete or placing the base 73 in the hole.

Next, the upper housing 77 may be secured to the lower housing 73 with bolts 81 or any other fastening device. In one aspect of the invention, and in order to provide extra rigidity and stability, the outer circumference formed by the side walls of the upper housing 77 is smaller than that of the lower housing 73 and/or the thickness of the side walls of the upper housing 77 is also less than that of the lower housing 73. However, it should be understood that the invention may be practiced with an upper housing 77 having an outer circumference larger than that of, or the same as, the lower housing. The pulley 17 is then secured to housing 77 and the cable 13 strung over it. The fuel cell stack 45 is secured to fuel cell auxiliary components 49 and reservoir 46. One end of the cable 13 is then secured to either the housing 77 or some other rigid support and the other end secured to the fuel cell stack 45/auxiliary components 49/reservoir 46. Thermal insulating blocks 69 are then placed along an interior wall of lower housing 73 and atop the stack 45/auxiliary components 49. The thus-secured stack 45/auxiliary components 49/reservoir 46 are then lowered in snug-fitting fashion within enclosing thermal insulating bocks 69 disposed along the interior wall of the base 73. Finally, the upper portions of each of the air intake 9, hydrogen conduit 21, exhaust line 5, coolant line 98 (depicted as line 29') may be connected at connections 33 to the corresponding lower portions (depicted as line 29") and the door 1 lowered and locked.

The present invention and/or various aspects of the present invention provide several advantages. First, exposure of freeze-sensitive fuel cell components may be inhibited or eliminated. Second, the fuel cell system may be protected from extremely warm conditions. Third, the footprint of a stationary fuel cell system and its fuel storage may be reduced. Fourth, the cost of installing a fuel cell system and its fuel storage (especially civil engineering costs) may be reduced and nearly eliminated. Fifth, the need for fencing requirements or other unauthorized access restriction may be eliminated when the housing 77 materials and construction are sufficiently resistant to tampering. This last advantage may be accomplished at a reasonable cost with a cylindrical aluminum or steel housing structure similar to those used for utilities such as highway lamp posts.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A fuel cell system comprising:
   a housing having an access opening or door;
   a fuel tank disposed within said housing at an upper portion thereof, said fuel tank containing a fuel;
   a fuel cell adapted to electrochemically produce water and electricity from the fuel and an oxidant, said fuel cell being adapted to rest on a support disposed at a bottom of a hole within which a lower portion of said housing rests;
   an oxidant line fluidly communicating between a source of oxidant and the fuel cell;
   a fuel line fluidly communicating between said fuel tank and said fuel cell; and
   a fuel cell vertical displacement device adapted to lower and raise the fuel cell between a lowered position where the fuel cell rests upon the support at the bottom of the hole within which the lower portion of said housing rests and a raised position where the fuel cell is accessible from outside said housing via said access opening or door.

2. The fuel cell system of claim 1, wherein said fuel is hydrogen, said fuel tank is a compressed hydrogen tank, said oxidant is air, and said oxidant line fluidly communicates between said fuel cell and an atmosphere adjacent said housing.

3. The fuel cell system of claim 1, further comprising thermal insulation disposed above said fuel cell and/or between said fuel cell and said lower portion of said housing.

4. The fuel cell system of claim 1, further comprising:
   a coolant reservoir in heat exchange with said fuel cell; and
   said fuel line includes a heat exchanger extending through an interior of said reservoir, said fuel line heat exchanger being adapted to exchange heat between said fuel flowing therethrough and coolant contained within said reservoir.

5. The fuel cell system of claim 1, further comprising:
   a coolant reservoir in heat exchange with said fuel cell; and
   said oxidant line includes a heat exchanger extending through an interior of said reservoir, said oxidant line heat exchanger being adapted to exchange heat between said oxidant flowing therethrough and coolant contained within said reservoir.

6. The fuel cell system of claim 2, further comprising:
   a coolant reservoir in heat exchange with said fuel cell;
   said fuel line includes a heat exchanger extending through an interior of said reservoir, said fuel line heat exchanger being adapted to exchange heat between said fuel flowing therethrough and coolant contained within said reservoir; and
   said oxidant line includes a heat exchanger extending through an interior of said reservoir, said oxidant line heat exchanger being adapted to exchange heat between said oxidant flowing therethrough and coolant contained within said reservoir.

7. A method of installing the fuel cell system of claim 1, comprising the steps of:
   excavating a hole in the ground;
   placing or forming at least lower portion of said housing in the hole;
   securing said fuel cell vertical displacement device to said fuel cell and said housing;
   placing said fuel tank within said upper portion of said housing;
   connecting said fuel line to said fuel tank and said fuel cell;
   connecting said oxidant line to said source of oxidant and said fuel cell; and
   lowering said fuel cell with said vertical displacement device to rest at a bottom of the hole without or without a support underneath.

8. The method of claim 7, wherein said fuel cell is disposed at a height below a frost line of the ground adjacent the hole.

9. The method of claim 7, wherein:
   said fuel cell system further comprises a reservoir in heat exchange with said fuel cell; and
   said fuel line includes a heat exchanger extending through an interior of said reservoir, said fuel line heat exchanger being adapted to exchange heat between said fuel flowing therethrough and coolant contained within said reservoir.

10. The method of claim 7, wherein:
    said fuel cell system further comprises a reservoir in heat exchange with said fuel cell; and
    said oxidant line includes a heat exchanger extending through an interior of said reservoir, said oxidant line heat exchanger being adapted to exchange heat between said oxidant flowing therethrough and coolant contained within said reservoir.

11. The method of claim 7, wherein:
    said fuel cell system further comprises a reservoir in heat exchange with said fuel cell;
    said fuel line includes a heat exchanger extending through an interior of said reservoir, said fuel line heat exchanger being adapted to exchange heat between said fuel flowing therethrough and coolant contained within said reservoir; and
    said oxidant line includes a heat exchanger extending through an interior of said reservoir, said oxidant line heat exchanger being adapted to exchange heat between said oxidant flowing therethrough and coolant contained within said reservoir.

12. A method of maintaining the installed fuel cell system of claim 7, comprising the steps of:
    disconnecting said fuel line into first and second portions, said first fuel line portion connected to said fuel tank and said second fuel line portion connected to said fuel cell;
    disconnecting said oxidant line into first and second portions, said first oxidant line portion being connectable to said source of oxidant and said second oxidant line portion being connected to said fuel cell;
    raising the fuel cell with the fuel cell vertical displacement device to a position accessible through said door;
    performing maintenance upon the fuel cell;
    lowering the fuel cell with the fuel cell vertical displacement device to the ground at the bottom of the hole
    connecting said fuel line portions; and
    connecting said oxidant line portions.

* * * * *